United States Patent [19]

Veaute

[11] 4,164,535

[45] Aug. 14, 1979

[54] ANTISTATIC TEXTILE MATERIALS

[75] Inventor: Georges Veaute, Ozouers en Touraine, France

[73] Assignee: Manufacture de Produits Chimiques Protex S.A., Paris, France

[21] Appl. No.: 843,217

[22] Filed: Oct. 18, 1977

[30] Foreign Application Priority Data

Oct. 19, 1976 [FR] France .................. 76 32033

[51] Int. Cl.² .......................... B29G 5/00; C08L 7/02; C08L 61/20
[52] U.S. Cl. ........................ 264/136; 260/4; 260/29.2 TN; 260/29.2 N; 260/29.4 UA; 260/29.6 MN; 260/29.6 NR; 260/29.6 ME; 260/29.6 RB; 260/27.7 N; 260/29.7 NR; 260/29.7 E; 428/265; 428/267; 428/425; 525/130; 525/123
[58] Field of Search ............... 264/248, 136; 428/265, 428/267, 425; 260/29.4 UA, 29.6 MN, 29.6 NR, 29.6 ME, 29.6 RB, 29.7 N, 29.7 NR, 29.7 E, 852, 4, 67.6 R, 29.2 TN, 29.2 N

[56] References Cited

U.S. PATENT DOCUMENTS

| | | | |
|---|---|---|---|
| 3,100,754 | 8/1963 | Booth et al. ................. | 428/67.6 R |
| 3,808,168 | 4/1974 | Young et al. ................. | 428/67.6 R |
| 4,021,505 | 3/1977 | Wang ............................ | 428/425 |
| 4,048,001 | 9/1977 | Remley ......................... | 428/425 |
| 4,053,440 | 10/1977 | Bonnet et al. .................. | 260/4 |

*Primary Examiner*—J. Ziegler
*Attorney, Agent, or Firm*—Karl F. Ross

[57] ABSTRACT

Textile materials are made with a binder to which is added an alkylene-urethane thermosensitive copolymer of the formula:

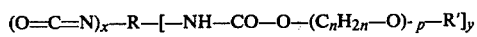

wherein
R is an aliphatic or aromatic moiety which contains a biuret, urethane or isocyanate group;
R' is hydrogen, $C_1$ to $C_8$ straight or branched chain alkyl, aryl or alkylaryl;
x ranges from 0 to 1 inclusive;
y is greater than 2;
n has a value of 1 to 4 inclusive; and
p is greater than 5 and the binder is controlled to have a pH of less than 5,5 at activation so that the textile material is antistatic.

7 Claims, No Drawings

ANTISTATIC TEXTILE MATERIALS

FIELD OF THE INVENTION

This invention relates to the treatment of textile materials held together by a binder for rendering the material antistatic, and to a method of making an antistatic textile product.

BACKGROUND OF THE INVENTION

The problems caused by the accumulation of static electricity on insulating materials and especially on textiles containing synthetic fibers comprised of polymers with hydrophobic groups and other low conductive materials are well-known. These problems include:

strong, disagreeable shocks caused by the rapid discharge of accumulated static electricity;

attraction of dust from the atmosphere to the fabric to form soiled spots thereon; and detriment to the functioning of sensitive electronic equipment because of static-electricity discharges.

Furthermore the problems posed by the accumulation of static electricity have taken on new meaning in view of recent changes in modern living. More and more synthetic textiles are used in the home and the increase in the use of central heating throughout the world helps to create a dry atmosphere which aids in the accumulation of static charge. The three ways known heretofore to combat the problem of static electricity in synthetic fibers are as follows:

use of highly conductive threads or fibers as the textile material;

incorporation into the fabric of very fine steel wires; and application of chemical antistatic agents to coat the fibers.

None of the above methods has been truly successful.

It is the last of the three methods mentioned above which is most currently used wherein the conductive additives (e.g. nitrogen-containing polymers, surface-active oxyethylenes, phosphoric acid esters) are introduced into the fiber or filament binding compositions by spraying onto the surface of the substrate textile material.

In Ser. No. 601,042 filed Aug. 1, 1975 (now U.S. Pat. No. 4,053,440), new latex compositions sensitive to heat are disclosed. These latex compositions contain a thermosensitizing agent comprising a urethane-alkylene copolymer of the formula:

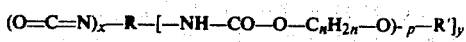

wherein R is an aliphatic or aromatic moiety which contains biuret groups, urethane groups, or isocyanate groups; R' is selected from the group which consists of hydrogen, $C_1$ to $C_1$ alkyl having a straight or branched chain, aryl and alkylaryl, x is 0 to 1, y is always greater than 2, n has a value of 1 to 4 inclusive and p has a value of at least 5. These polymers are described as having the ability to lower the coagulation temperature of latex polymers.

OBJECT OF THE INVENTION

The object of the invention is to provide an antistatic treatment for synthetic fibers held together by a binder.

SUMMARY OF THE INVENTION

The present invention is an antistatic treatment for synthetic-textile fibers held together by a binder which includes a urethane-alkylene copolymer of the formula:

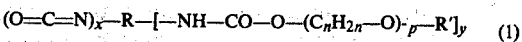

wherein R is an aliphatic and/or aromatic moiety which contains biuret groups, urethane groups, or isocyanate groups, R' is selected from the group consisting of hydrogen, $C_1$ to $C_8$ straight or branched chain alkyl, aryl or alkylaryl, x is 0 to 1, y is always greather than 2, n has a value of 1 to 4 inclusive and p is greater than 5.

According to a preferred mode of the invention R is a radical having the formula:

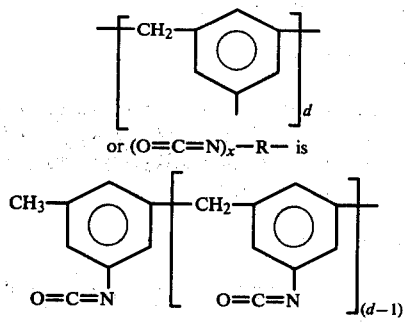

wherein d is a number between 2.4 and 2.8 and 4' is butyl.

The application of the binder composition is carried out at a pH less than or equal to 5.5 preferably less than 5.5 and more preferably less than or equal to 4.5 with best results at 4 or below. The percentage of the thermosensitive additive as a part of the total binder varies from 0.1 to 5% and especially from 0.2 to 2% (expressed as dry solids).

The binder composition can contain either natural or synthetic latex thermoplastic polymers. The latex component can be for example homopolymers of a conjugated diolefin such as butadiene, methylbutadiene, isoprene, and related homologs; copolymers of diolefins including vinyl and acrylic monomers which are copolymerizable with monomers such as styrene, methyl methacrylate, vinyl acetate, acrylonitrile, acrylic esters, acrylic acid, methacrylic acid, vinyl chloride, vinylidene chloride; the copolymers of conjugated diolefins with isoolefins such as isobutylenes; the homopolymers and copolymers of ethylene with vinyl and acrylic monomers such as those cited above or with copolymerizable olefins such as propylene; vinyl homopolymers or copolymers such as vinyl acetate, vinyl chloride; homopolymers and copolymers of acrylic esters such as methyl acrylate, ethyl acrylate, butyl acrylate, methyl methacrylate, butyl methacrylate, acrylic acid, methacrylic acid, acrylamide, N-methylol-acrylamide, and glycidyl methacrylate; vinyl-acrylic copolymers such as the copolymers of vinyl acetate and acrylic esters, the copolymers of vinyl chloride or vinylidene chloride with acrylic esters or the copolymers of styrene and acrylic esters.

The best results will be obtained where the thermosensitive product is utilized in the presence of a latex composition containing a hydrophilic group therein.

Particularly effective hydrophilic groups are carboxy groups obtained by copolymerization of the latex with acrylic acid, methacrylic acid or itaconic acid.

The quantity of latex used can vary from 5 to 30% and is preferably between 10 and 25% (expressed in dry weight) of the total binder composition.

In addition to containing the thermosensitive material and the latex the binder may also contain a thermosetting resin chosen from a group of resins such as urea-formaldehyde or memamine-formaldehyde. The amount of these resins used (calculated on the basis of dry weight) is between 5 and 15% of the quantity of latex used and a polymerization catalyst is employed for these resins such as ammonium salts, amine salts, or metal salts in proportions varying between 10 and 20% (dry weight) of the thermosetting resin.

The copolymers urethane-oxylalkylene according to the present invention can be prepared by reacting a polyisocyanate of the formula:

$$R-[-N=C=O]_z \quad (2)$$

where z equals x plus y as defined above and is always greater than 2, with 30 to 100% by weight of a monoalkylic, monoarylic or monoalkylarylic ether of polyalkylene glycol of the formula:

$$R'-[-O-C_nH_{2n}-]-OH \quad (3)$$

and 0 to 30% by weight of polyalkyleneglycol of the formula:
$$H-[O-C_nH_{2n}-]_p-OH \quad (4)$$

In the formulas (2), (3), (4) given above the radicals R, R' and the coefficients n, p have the meanings previously set forth. The reaction is carried out under conditions such that the isocyanate functional groups react in part or completely with the hydroxyl groups terminating the polyalkylene glycols and their ethers.

The polyisocyanates represented by formula (2) are well known to the skilled worker in the art. The principal polyisocyanates utilized according to the invention are:

(a) the polyphenylic isocyanates of the formula:

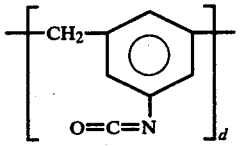

in which d has a value from 2.4 to 2.8;

(b) the triphenylmethyl triisocyanate of the formula:

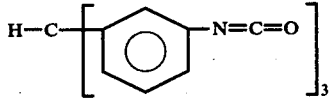

(c) the polyisocyanates prepared by condensation of a diisocyanate and a polyol under conditions such that the compound contains per molecule at least two N—C—O groups in a free or reactive state.

An example of this class of polyisocyanates is the product of the reaction of three moles of tolylene diisocyanate with one mole of trimethylolpropane which gives a urethane structure which can be represented ideally by the formula:

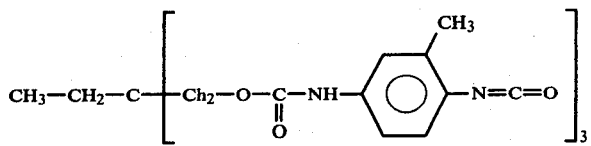

(d) the polyisocyanates prepared by condensation of a diisocyanate with water with the formation of cyclical isocyanates.

(e) The polyisocyanates prepared by condensation of diisocyanate with water with formation of biuret groups.

An example of this class of polyisocyanates is the product of the condensation reaction of water with three moles of 1,6-hexamethylene diisocyanate which produces the biuret structure represented by the formula:

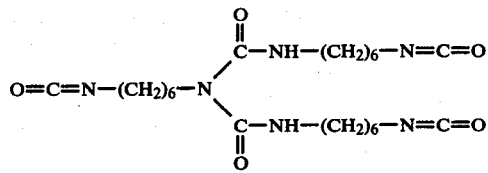

The list of polyisocyanates which can be used according to the invention and given above should not be considered limiting although the list does represent the preferred polyisocyanates. Furthermore, the polyisocyanates can be used individually or in admixture.

The monoethers of the polyalkylene glycols represented by formula (3) and the polyalkylene glycols represented by formula (4) are also well known to those skilled in the art. It is possible to form these compounds by reacting water or a monohydric alcohol of the formula R'OH with an alkylene oxide or a mixture of alkylene oxides. The reaction conditions are controlled so as to ensure an oxyalkylene number (value of p) per mole of water or alcohol in excess of 5 and preferably between 5 and 100 or more. The molecular weight of the polyalkylene glycols and the monoethers is preferably between 800 and 20,000. The alkylene oxides which are most desirable according to the invention are those containing 2 to 4 atoms of carbon (inclusive) per alkylene group such as ethylene oxide, propylene oxide and butylene oxide.

The monoethers of the polyalkylene glycols and the polyalkylene glycols are able to contain oxyalkylene groups which are all identical or a mixture of oxyalkylene groups. In the preferred compounds of the present invention, the oxyalkylene groups are a mixture of ethylene oxide groups and propylene oxide groups. When such a mixture is used, it is generally preferable for the oxyethylene groups to constitute 25 to 75% of the total weight of the thermosensitization compound. The preferred polyalkylene glycol compounds are the monoethers thereof. Of course it is possible to use a mixture of monoethers of polyalkylene glycols and of polyalkylene glycols. In this case the polyalkylene glycols should not make up more than 30% by weight of the mixture of polyalkylene glycol monoethers and the nonetherified polyalkylene glycols.

The reaction used to prepare the copolymer of urethane and alkylenes according to formula (1) is relatively direct and simple. It can be carried out by directly mixing the polyisocyanates and a mixture of polyalkyleneglycol esters as described above and heating the reaction mixture to a temperature between 80° and 100° C. to effect the reaction. A suitable solvent for the reaction mixture is toluene although any other solvent for the two components may be used. The toluene can be provided with or without a catalyst for the isocyanate-hydroxyl reaction. Suitable catalysts are tertiary amines or tin salts. The urethane-alkylene copolymers of formula (1) are obtained in the form of viscous oils which are soluble in cold water and have a cloud point of about 30° through 50° C. Their aqueous solutions are stable and compatible with natural or synthetic polymer latexes.

The thermosensitive compositions according to the present invention are obtained by simply adding the urethane-alkylene copolymer of formula (1) to the latex, utilizing a quantity of the copolymer necessary to obtain the desired coagulation temperature. This temperature can be controlled for any particular latex by the proportion of the urethane-alkylene copolymer which is added, although the coagulation temperature will generally lie in a range between 30° C. and 80° C. In general it is preferred to control the coagulation temperature so that it lies up to 45° C. and more specifically about 40° to 42° C. for antistatic purposes.

The alkylene oxide-urethane copolymers of formula (1) which are in liquid or waxy form can be added to the latex as is or dissolved in water. In the latter case the aqueous solution is added to the latex. In general it is preferred to add an aqueous solution of the urethane-alkylene oxide copolymer to the latex.

The quantities of urethane-alkylene oxide copolymers which can be used to obtain the thermosensitivity described are generally between 0.05 and 5 parts by weight per 100 parts by weight of the solid material of the latex.

EXAMPLE 1

In a 2-liter flask provided with an agitator, a thermometer and a reflux condenser, 500 grams of toluene and 100 grams of the monobutylic ether of a copolymer of ethylene glycol and propylene glycol (in the proportion 50/50 by weight) of a molecular weight of about 10,000, are processed. Traces of water are first eliminated by azeotropic distillation of the water-toluene and then 2.5 grams of the polyisocyanate of phenylene polyisocyanate (commercially marketed under the designation PAPI) are added prior to the reaction. The mixture is heated at 100° to 110° C. for a period of three hours whereupon the toluene is eliminated by distillation in vacuo at 170° C. and 40 mm of mercury.

The product (A) thus obtained is a clear yellow oil of high viscosity, soluble in cold water, having a cloud point of 44° C.

EXAMPLE 2

The method of Example 1 is followed utilizing an excess of phenylene polyisocyanate with respect to the butylic monoether of polyethylene/polypropylene glycol (50/50 by weight).

The product (B) thus obtained, which contains isocyanate groups in a free or reactive state, can then be reacted with water and is a brownish clear oil of high viscosity, soluble in cold water and having a cloud point of 38° C.

EXAMPLE 3

Into a 2-liter flask provided with an agitator, a thermometer and a reflux condenser, there are introduced 500 grams of toluene and 100 grams of the butylic monoether of polyethylene glycol-polypropylene glycol of molecular weight on the order of 8000, the ethyleneglycol and the propyleneglycol being present in a proportion of 50/50 by weight.

After elimination of water by azeotropic distillation, 3.5 grams of a solution of 75% concentration of polyisocyanate, obtained by condensation of hexymethylene diisocyanate with water, is introduced. This polyisocyanate is commercially marketed under the name DESMODUR N.

The mixture is refluxed for two hours and the solvent is eliminated by distillation at 170° C. under a vacuum of 40 mm of mercury.

An oily product (C) of yellowish clear color is obtained. The product C is soluble in cold water and has a cloud point of 44° C.

EXAMPLE 4

Into a 2-liter flask provided with an agitator, thermometer and a reflux condenser, 500 grams of toluene and 100 grams of the butylic monoether of polyethylene glycol/polypropylene glycol (50/50 by weight) with a molecular weight of 10,000 are introduced.

After the water has been eliminated by azeotropic distillation, 5.7 grams of a 75% solution of a polyisocyanate obtained by the condensation of toluene diisocyanate with trimethylolpropane, in ethylacetate, is introduced. The polyisocyanate is commercially available under the name DESMODUR L. The mixture is refluxed for three hours and the toluene is then removed by vacuum distillation at 40 mm mercury and 170° C. The product (D) thus obtained is a very viscous yellow oil soluble in cold water and having a cloud point of 42° C.

EXAMPLE 5

Into a 2-liter flask provided with an agitator, a thermometer and a reflux condenser, there are introduced 500 ml of toluene, 70 grams of butylic monoether of polyethylene/polypropylene glycol (proportion 50/50 by weight) with a molecular weight of 10,000, and 30 grams of the monylphenolether of polyethylene glycol having a molecular weight of 1524. After elimination of traces of water by azeotropic distillation, 7.2 grams of a solution commercially available under the name DESMODUR N is introduced. This solution has a concentration of 75% by weight of a mixture of ethylglycolacetate and xylenepolyisocyanate.

The reaction mixture is refluxed for three hours, the solvents being eliminated by distillation at 170° C. under a vacuum of 40 mm of mercury.

The product (E) thus obtained is white, highly viscous, soluble in water (cold) and has a cloud point of 41° C.

EXAMPLE 6

The preceding Example is repeated with a mixture of 70 grams of the monobutylether of polyethylene-polypropylene glycol (proportion 50/50 by weight) with a molecular weight of 10,000 and 30 grams of a copolymer sequence: polyethylene-polypropylene glycol commercially marketed under the name PLURONIC of a molecular weight of 1830, and 8.5 grams of the polyisocyanate of Example 5.

The product (F) is obtained which is highly viscous, while, soluble in cold water and having a cloud point of 45° C.

EXAMPLE 7

The binder compositions below were applied to a fibrous support of polypropylene.

|  | Baths (parts) | | | |
|---|---|---|---|---|
|  | I | II | III | IV |
| Thermoplastic Emulsion A' 47% (dry weight), comprised of a composition containing: 96.5% ethyl ethyl acrylate 0.75% acrylic acid 2.75% itaconic acid | 200 | 200 | 200 | 200 |
| Thermoplastic Emulsion B' 25% (dry weight), containing 85% ethyl acrylate 10% 2-ethylhexylacrylate 5% sodium acrylate | 150 | 150 | 150 | 150 |
| Thermosetting Resin C' 65% (dry weight) - a trimethylol-methylated melamine | 20 | 20 | 20 | 20 |
| Polymerization Catalyst D'- an aqueous solution of 15% ammonium chloride | 10 | 10 | 10 | 10 |
| Antistatic agent containing 30% (dry weight) of a phosphate ester | | 10 | | |
| Antistatic agent containing 30% (dry weight) of a quaternary styrene polymer | | | 10 | |
| Thermosensitive agent containing 10% (dry weight) of a resin obtained by reaction of a polyalkylene glycol ether with a polyisocyanate (or any of products A - F of Examples 1 - 6, preferably A) | | | | 30 |
| Sufficient quantity of water for coating bath | 1L | 1L | 1L | 1L |
| pH of the bath | 6 | 6 | 6 | 4 |

The impregnation of the support fiber was carried out by pressing and squeezing out of 150% of the dye bath in proportion to the weight of the cloth, followed by a tenter drying step for 10 minutes at 125° C. The antistatic characteristics of the different supports were tested in atmospheres containing:
(a) 60% relative humidity; and
(b) 20% relative humidity.
The time that it took each tested polypropylene to lose one-half of its static electricity was then measured.

| Humidity | Bath I | Bath II | Bath III | Bath IV | Untreated |
|---|---|---|---|---|---|
| 60% | 33 sec. | 19 sec. | 15 sec. | 2 sec. | 2 min. 20 sec. |
| 20% | 26 min. | 22 min. | 20 min. | 6 min., 30 sec. | 30 min. |

The superiority of Bath IV to all the others can easily be seen in the dry atmosphere of 20% relative humidity.

EXAMPLE 8

The following binder compositions were applied to fibrous supports of polyamide:

|  | Bath I | Bath II |
|---|---|---|
| Thermoplastic emulsion A' | 200 parts | 200 parts |
| Thermoplastic emulsion B' | 150 | 150 |
| Thermosetting resin C' | 20 | 20 |
| Polymerization catalyst D' | 10 | 10 |
| Thermosensitizing agent containing 10% (dry weight) of the resin of Example 7 | 30 | 30 |
| Distilled water | 1L | 1L |
| pH | 6.3 | 4.5 |

The pH has been chosen in such fashion that Formula I does not undergo thermocoagulation although Formula II does coagulate when heated to about 40° C. The same procedures as those of Example 7 were used to determine the time to remove one-half of the static electricity from the polyamide substrate. The half-discharge times are as follows:

| Relative Humidity | Bath I | Bath II |
|---|---|---|
| 60% | 8 sec. | 2 sec. |
| 20% | 18 min. | 6 min. 30 sec. |

The results obtained here show that the pH of the bath is indeed very important.

EXAMPLE 9

A comparision test was set up between the thermosensitizing agent according to the invention and a known commercial thermosensitizing agent containing a polysiloxane strongly hydrophobic functional group. The following composition was applied to a polypropylene support according to the conditions of Example 7.

|  | I | II | III | IV |
|---|---|---|---|---|
| Thermoplastic emulsion A' | 200 | 200 | 200 | 200 |
| Thermoplastic emulsion B' | 150 | 150 | 150 | 150 |
| Thermosetting resin C' | 20 | 20 | 20 | 20 |
| Polymerization catalyst D' | 10 | 10 | 10 | 10 |
| Thermosensitizing agent containing 10% (dry weight) of resin A of Example 1 | 30 | 30 | | |
| Thermosensitizing agnet containing 10% (dry weight) of a resin containing a strongly hydrophobic group | | | 30 | 30 |
| pH | 4.5 | 6.3 | 4.5 | 6.5 |
| Coagulation Temperature | 40° C. | none | 42° C. | none |

The time of the half discharge for the polypropylene substrates tested in each of the Baths I through IV was recorded at 65% relative humidity and at 20% relative humidity.

| Relative Humidity | Bath I | Bath II | Bath III | Bath IV |
|---|---|---|---|---|
| 65% | 2 sec. | 8 sec. | 23 sec. | 12 sec. |
| 25% | 6 min., 30 sec. | 18 min. | 29 min. | 17 min. |

Only the product prepared according to the invention (Formula I) gives the improved results.

I claim:
1. In a method of making a textile material wherein textile fibers are bonded by a a thermally activatable binder, the improvement which comprises rendering the textile material antistatic by adding to the binder an alkylene-urethane thermosensitive copolymer of the formula:

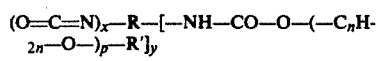

wherein

R is an aliphatic or aromatic moiety which contains a biuret, urethane or isocyanate group;

R' is hydrogen, $C_1$ to $C_8$ straight or branched chain alkyl, aryl or alklyaryl;

x is between 0 and 1 inclusive;

y is greater than 2;

n has a value of 1 to 4 inclusive; and p is greater than 5; and controlling the pH of the binder upon thermal activation thereof so as to be at most 5.5.

2. The improvement defined in claim 1 wherein R is

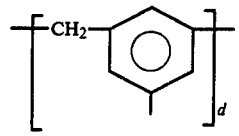

d is between 2.4 and 2.8, and

R' is butyl.

3. The improvement defined in claim 1 wherein the pH of the binder is at most 4.5.

4. The improvement defined in claim 3 wherein the pH of the binder is at most 4.

5. The improvement defined in claim 3 wherein the percentage of the alkylene-urethane thermosensitive copolymer expressed in dry weight of the total amount of the binder is between 0.1 and 5%.

6. The improvement defined in claim 5 wherein the percentage of the alkylene-urethane thermosensitive copolymer expressed in dry weight of the total amount of the binder is between 0.2 and 2%.

7. The improvement defined in claim 1 wherein the binder comprises:
- between 10 and 25% dry weight of a latex thermoplastic containing a hydrophilic group;
- between 5 and 15% of the latex of a thermohardenable aminoplast-containing resin; and
- between 10 and 20% of the latex of a polymerization catalyst for the thermohardenable resin selected from the group consisting of ammonium salts, amine salts and metal salts.

* * * * *